(12) United States Patent
Riegger et al.

(10) Patent No.: US 10,967,503 B2
(45) Date of Patent: Apr. 6, 2021

(54) ROBOT WITH MULTIPLE COUPLING TRANSMISSION UNITS WITH A LIGHTWEIGHT DESIGN

(71) Applicant: fruitcore GmbH, Constance (DE)

(72) Inventors: Jens Robert Riegger, Constance (DE); Manuel Tobias Frey, Constance (DE)

(73) Assignee: fruitcore robotics GmbH, Constance (DE)

( * ) Notice: Subject to any disclaimer, the term of this patent is extended or adjusted under 35 U.S.C. 154(b) by 440 days.

(21) Appl. No.: 16/067,902

(22) PCT Filed: Jan. 8, 2017

(86) PCT No.: PCT/IB2017/050073
§ 371 (c)(1),
(2) Date: Jul. 3, 2018

(87) PCT Pub. No.: WO2017/118953
PCT Pub. Date: Jul. 13, 2017

(65) Prior Publication Data
US 2020/0262056 A1    Aug. 20, 2020

(30) Foreign Application Priority Data

Jan. 8, 2016  (DE) .................. 10 2016 000 118
Mar. 2, 2016  (EP) .................... 16020061

(51) Int. Cl.
*B25J 9/06*   (2006.01)
*B25J 9/04*   (2006.01)
(Continued)

(52) U.S. Cl.
CPC ............. *B25J 9/046* (2013.01); *B25J 9/106* (2013.01); *B25J 9/109* (2013.01); *F16H 21/44* (2013.01)

(58) Field of Classification Search
CPC .. B25J 9/046; B25J 9/106; B25J 9/109; F16H 21/44
See application file for complete search history.

(56) References Cited

U.S. PATENT DOCUMENTS 6,748,819 B2 *   6/2004   Maeguchi .............. B25J 9/1065
                                                     414/735

FOREIGN PATENT DOCUMENTS

CN    104626107 A    5/2015
CN    103787205 B    11/2015
(Continued)

OTHER PUBLICATIONS

International Search Report for PCT/IN2017/050073 dated May 3, 2017, 3 pages.
(Continued)

*Primary Examiner* — Randell J Krug
(74) *Attorney, Agent, or Firm* — Fletcher Yoder, P.C.

(57) ABSTRACT

The invention relates to a robot with a base (3), a pivoting arm (4) which is articulated to the base (3) and which is pivotable about a rotational axis (13), wherein at the free end of the pivot arm (4) a pivotable mounting for a possible support arm (5) may be provided, and at least one drive unit (6, 7) for driving the pivot arm (4) and the possible support arm (5). According to the invention, a first drive unit (6) is coupled to a first four-bar linkage (8), a second four-bar linkage (9) is coupled to the first four-bar linkage (8) in such a way that the pivot arm (4) can be pivoted by the first drive unit (6).

9 Claims, 4 Drawing Sheets

Figure 1:
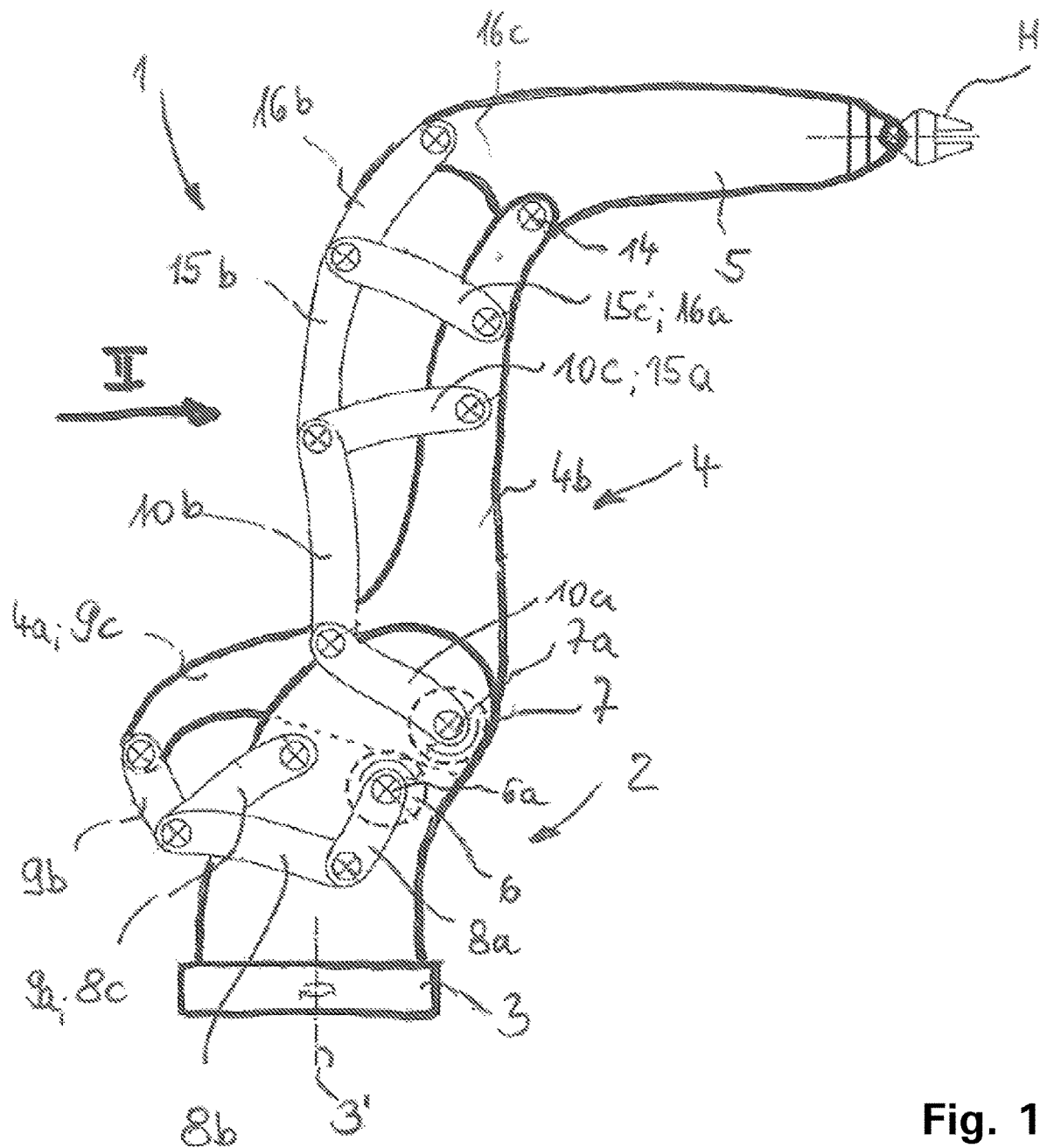

(51) Int. Cl.
*B25J 9/10* (2006.01)
*F16H 21/44* (2006.01)

(56) References Cited

FOREIGN PATENT DOCUMENTS

| EP | 1052071 | A2 | 11/2000 |
|----|---------|----|---------|
| EP | 2397279 | A1 | 12/2011 |
| JP | 60-131180 | A | 7/1985 |
| JP | 61-27688 | U | 2/1986 |

OTHER PUBLICATIONS

Notice of Reasons for Rejection for JP 2018-536180 dated Nov. 24, 2020, with English translation, 14 pages.

\* cited by examiner

ROBOT WITH MULTIPLE COUPLING TRANSMISSION UNITS WITH A LIGHTWEIGHT DESIGN

CROSS-REFERENCE TO RELATED APPLICATIONS

This application is a national stage of PCT Application No. PCT/IB2017/050073, entitled "ROBOT WITH MULTIPLE COUPLING TRANSMISSION UNITS WITH A LIGHTWEIGHT DESIGN", filed on Jan. 8, 2017, which claims priority of European Patent Application No. 16020061.4 filed Mar. 2, 2016, and of German Patent Application No. 102016000118.6, filed Jan. 8, 2016, all of which are hereby incorporated by reference in their entirety.

TECHNICAL FIELD

The invention relates to a robot with a base, a pivot arm, which is hinged to the base and can be pivoted about a pivot axis, wherein a pivotal mounting area can be provided at the free end of the pivot arm; at least one drive unit for driving the pivot arm and the possible support arm; as well as several links to transmit the movement onto the pivot arm and the possible support arm.

Definitions

Mechanical linkage is one of the six fundamental types of transmissions. Together with cam gears, they form the group of non-uniformly transmitting gears.

A coupling transmission unit consisting of at least four links forms a four-bar linkage. In the present case, a four-bar linkage is defined by two bearings—which substitute a first link—and by three further movable links. The driven link, coupled to the first bearing, is the crank, at the free end of which the coupling is pivotally disposed. The latter is, in turn, pivotally coupled to the free end of the further link, namely the pivotally coupled rocker, wherein the other rocker joint is in turn coupled to the second bearing.

A link is understood to be an element which, in conjunction with other links, effects a movement of the pivot arm and/or support arm and distributes the forces, at least partially, particularly to the base and the pivot arm, even at a standstill. Each link has a joint at its free ends for coupling with a further link. A body is provided between the joints. A link can consist of several elements. Thereby at the free ends, a pivot is provided as a joint, which can have a degree of freedom in the plane. Alternatively, a ball joint having three rotational degrees of freedom can also be provided. Alternatively, these links may also have separate mountings at their free ends, which serve to form joints. The bodies of the links are plate-shaped and/or rod-shaped elements. These are understood to be elements that are elongated (longer than wide) and have thin diameters, i.e. having thin beam-like or rod-shaped or plate-shaped design. These can also have free-form structures, such that collisions with other member elements are avoided during the corresponding sequences of motion. Links of the aforementioned type can also be produced in 3D printing.

The robot has a base. This base is understood as a foundation for receiving the moving support structure—in particular the pivot arm and the support arm. This base is formed either in one piece or in several parts. It can be provided that the base is moved translationally and/or rotationally or is fixedly disposed.

The drive unit can be understood as pertaining to a drive motor and a gear unit that are possibly coupled to the motor and/or a transmission unit for transmitting the torque of the drive motor to a drive shaft. The term "gear unit" mainly refers to gear couplings, and the term "transmission unit" refers to all other couplings, for example, belt couplings.

All moving parts (except for the base) of the robot, in particular the pivot and support arms, are to be understood as moving support structures.

The base, pivot and support arm are defined as basic elements of the robot. These can be realised either in one piece or multiple pieces.

Technical Field

The conventional technical solutions of known robots, in particular articulated robots, consist of a base, a pivot arm and a support arm. The base, pivot arm and support arm are articulated, preferably pivotally coupled to each other and whose axes of rotation are at least partially driven. This means that the pivot arm and the support arm are usually driven directly in the corresponding axes of rotation by means of drive motors, which can also be optionally additionally coupled to a transmission unit. Also known are models of articulated robots, in which the two arm elements are driven by belt drives or cables. Also articulated robots, in which the arm elements are indirectly driven by means of four-bar linkage, are also state-of-the-art.

State of the Art

An articulated arm robot with a coupling gear is known from EP 2 397 279 A1. This articulated arm robot has a base with a first rotational axis and a base unit, on which a pivot arm is pivotally coupled. At least indirectly, a support arm is coupled to the pivot arm, at the free end of which a gripping tool is disposed.

At the base unit, a drive motor is provided, whereby the pivot arm is driven by a coupling gear. Another drive motor is also disposed at the base and drives the support arm via a further coupling gear, whereby this coupling gear represents a four-bar linkage.

Object of the Invention

The object of the invention is to provide a robot which, compared to the existing robot variants, has lower net weights, and at the same time, high rigidity of the entire supporting structure.

Solving the Object

The solution of the object is provided by the features of claim 1.

Advantages of the Invention

In addition to solving the problem, the basic idea of the invention has the advantages that a particular embodiment of the robot consists of basic components which can be produced at low cost, has a large working space and increased velocities. Due to the kinematic structure and the resulting weight-based lightweight components, a lower drive power is sufficient. The resulting robot can thus be manufactured very inexpensibly without compromising functionality.

On the other hand, the inventive design also allows the robot to be scalable and can therefore be intended for other applications. Due to the design of the kinematics for the pivot arm and the support arm, it is possible by appropriately dimensioning the kinematics, for example, to lift and move heavy loads.

In the robot presented here, a pivot arm and a support arm form a mechanical serial kinematic chain consisting of two basic elements. These are moved by drive units via links. A minimal design of such a robot can have two degrees of freedom. The maximum number of degrees of freedom can be achieved by turning the base around the vertical axis and connecting a wrist at the end of the support arm.

The basic idea of the invention presented here is to drive both the pivot arm and the support arm at least indirectly via four-bar linkage. This means that the respective drive axis is not aligned with the rotational axis of the respective arm. In each case, the drive units are preferably located at the base, and are therefore not in the moving support structure. This has the great advantage that there are no drive components, such as drive motors, gears, belt pulley bearings and gearwheels, or the like, on the moving components themselves. Thus, considerable weight can be saved, which does not have to be additionally moved and absorbed by appropriately dimensioned bearings. As a result, a lightweight construction of the robot is possible.

A preferred embodiment consists of forming the support arm and the respective link of the four-bar linkage from rod and/or plate-shaped elements. The pivot arm and the support arm each consist of at least two rod and/or plate-shaped elements arranged in relation to each other, which are held at a distance by a connecting element, so that a larger moment of inertia occurs for the respective arm-like design.

The base is preferably formed from rod and/or plate-shaped elements. Connecting elements are thereby present, which provide the necessary stability to the base. In addition, mounts for the drive units are provided at the base. The distance between the rod and/or plate-shaped elements is designed in such a way that the formations of the pivot arm and the support arm are arranged between them. A preferred embodiment of the robot is a U-shaped design of the base. The drive units are mounted below, i.e. on the closed U-side, the rotational movement is guided to the drive shaft via a belt drive.

This type of execution of the rod and/or panel-shaped elements makes it possible to achieve a very compact and rigid overall structure. The individual elements (the base, pivot arm, support arm and four-bar linkagebar linkage with their links) are assembled with bar and/or plate-shaped elements made of an alloy, a fibre composite material or a plastic or other material which may be provided with recesses. This reduces the manufacturing costs of the robot, as the rod and/or plate-shaped elements can be produced cost-effectively and can be assembled into a rigid structure by performing only a few work steps. Alternatively, the individual elements can consist of, for example, die-cast parts, milled parts, turned parts or 3D printed parts.

The robot can be constructed symmetrically, which has the advantage that no unfavourable torsional stresses and moments are introduced into the supporting structure of the robot.

A simple design provides that a drive unit is arranged at the base, wherein said drive unit is coupled to a first link of a first four-bar linkagebar linkage and this four-bar linkagebar linkage is coupled to a second four-bar linkagebar linkage, the latter being coupled to the pivot arm of the robot.

Advantageously, two drive units are disposed at the base, wherein one drive unit being coupled to the first link of the first four-bar linkage, and the second drive unit being coupled to the first link of a third four-bar linkage.

The pivot arm is driven by a first drive unit via two four-bar linkages. The first four-bar linkage has a first link as a crank. This link is connected to a drive shaft, which is coupled at least indirectly to the first drive unit. A second link is connected to this link as a pivot joint, at the free end of which, a third link is connected to its first end as a rocker, whose free end, in turn, is fixedly but pivotally coupled to the base.

The second four-bar linkage consists of a further link element as a crank, one free end of which is preferably coupled to the base and corresponds to the rocker of the first four-bar linkage. However, this crank is not moved by a drive, but instead by the first four-bar linkage. The other end is pivotally coupled to another link element (coupling), whereby the end opposite the first four-bar linkage is pivotally coupled to the pivot arm. The pivot arm corresponds to the rocker of the second four-bar linkage, since the pivot arm is pivotally coupled to the base.

The link, which is part of the first and second four-bar linkages, is preferably arranged pivotally coupled at the base. As a result, a significant proportion of the forces generated by stopping and/or moving the robot, in particular loads, are transferred to the stable and solid base. The power of the drive motor can therefore be lower compared to previous embodiments of articulated robots, which distribute the forces generated almost exclusively over the support structure. This in turn reduces the load on the drive units.

Alternatively, instead of the second four-bar linkage described so far, two further four-bar linkages may occur, such that the coupling of the second four-bar linkage described so far consists of two links, the first link representing the coupling of the second four-bar linkage described so far and the second link representing the coupling of a further four-bar linkage, wherein a further pivotally connected link extends from the pivotally articulated connection of these links, which at the free end, is pivotally coupled to the base and represents the rocker of the second and the crank of the further four-bar linkage. At the end of the belt opposite to the crank, another link (rocker) is coupled in the form of a pivot arm.

The second drive unit has a drive axis, which is non-rotatably coupled to a link element of the third four-bar linkage. As a result, the support arm can be moved accordingly.

The different embodiments described below show how the support arm can be moved advantageously with one, two or even three four-bar linkages.

First Alternative

This third four-bar linkage has a first link which is rotationally coupled to a drive axis of the drive unit, wherein a further link is connected to the first link (crank) at the end opposite the drive axis as a coupling, and the latter is in turn rotationally coupled to the support arm, thus forming the third link as a rocker of the four-bar linkage.

Second Alternative

Alternatively, instead of the third four-bar linkage described above, two four-bar linkages can be provided, such that two links replace the coupling described above (First Alternative), each of these links each represent the couplings of a new third four-bar linkage and a new fourth four-bar linkage, wherein a further pivotally connected link extends from the pivotal connection of these two links, which at the free end is pivotally coupled to the pivot arm and forms the rocker of the new third four-bar linkage and the crank of the new fourth four-bar linkage.

Third Alternative

One advantageous design is that three four-bar linkages, i.e. a third, a fourth and a fifth four-bar linkage, are used to move the support arm.

The third four-bar linkage has a first link which is rotationally coupled to a drive axis of a second drive unit, a further link adjoining the first link (crank) at the end opposite of the drive axis, and adjoining it is a third link as a rocker, the free end of this third link of the third four-bar linkage being in turn rotationally coupled to the pivot arm at its one end. This third link of the third four-bar linkage corresponds to the first link of the fourth four-bar linkage, which serves as a crank, whereby it is coupled to the end of a second link of the fourth four-bar linkage, and this in turn is pivotally coupled to a third link, the free end of which in turn is pivotally connected to the pivot arm. This third link of the fourth four-bar linkage corresponds to the first link of the fifth four-bar linkage, which serves as a crank, being coupled to the end of a second link of the fifth four-bar linkage, which in turn is rotatably coupled to the support arm, thus forming the third link in the form of a rocker of the four-bar linkage.

The design of the four-bar linkages described above ensures that the loads caused by a payload or similar stresses on the robot are evenly transferred to the pivot arm, and thus to the support structure and the base, and that the links complement each other in such a way that, depending on the robot position, at least one of the two links acting on the pivot arm absorbs forces, and thus noticeably relieves the drive motor in virtually every position of the robot. In addition, the formation of the four-bar linkages together with the drive units makes it possible to cover a larger working area.

According to a preferred embodiment, the pivot arm is designed, such that it forms a rocker around an axis of rotation, with the drive of the pivot arm (by the first and second four-bar linkages) being arranged on one side of the rocker, and the support arm on the other side. This has the advantage that the forces on the support arm caused by the load are partially compensated by the rocker-shaped structure, thereby noticeably minimizing the required drive power, which in turn has a positive effect on manufacturing costs.

A further embodiment provides for a combination with compensating elements (such as springs or weights) that are mounted particularly in the area between the second rotational axis and the point of action of the pivot arm drive.

The arrangement and length ratios of the links, in particular, those designed as a crank, also enable the forces arising from loads to be at least partially balanced and torque peaks to be minimized in the torque curve at matched distances between the individual joint axes.

According to another preferred embodiment of the robot, the arrangements of the links (of both drives), in particular, those designed as cranks, are selected in such a way that the maximum drive power of the two drive motors is equal. This has the advantage that identical components (motor, transmission, belts, etc.) can be used, and thereby further costs can be saved.

A simple embodiment of the robot is to provide the pivote arm and support arm out of rod-shaped and/or plate-shaped elements, so as to achieve a low weight in the moving support structure. Alternatively, this can be achieved by lightweight materials, such as fiber composites, regardless of the structure. The articulated elements can be bar-shaped, plate-shaped or have other free forms.

Further advantageous embodiments will become apparent from the following description, the claims and the drawings.

DRAWINGS

Figure 2:
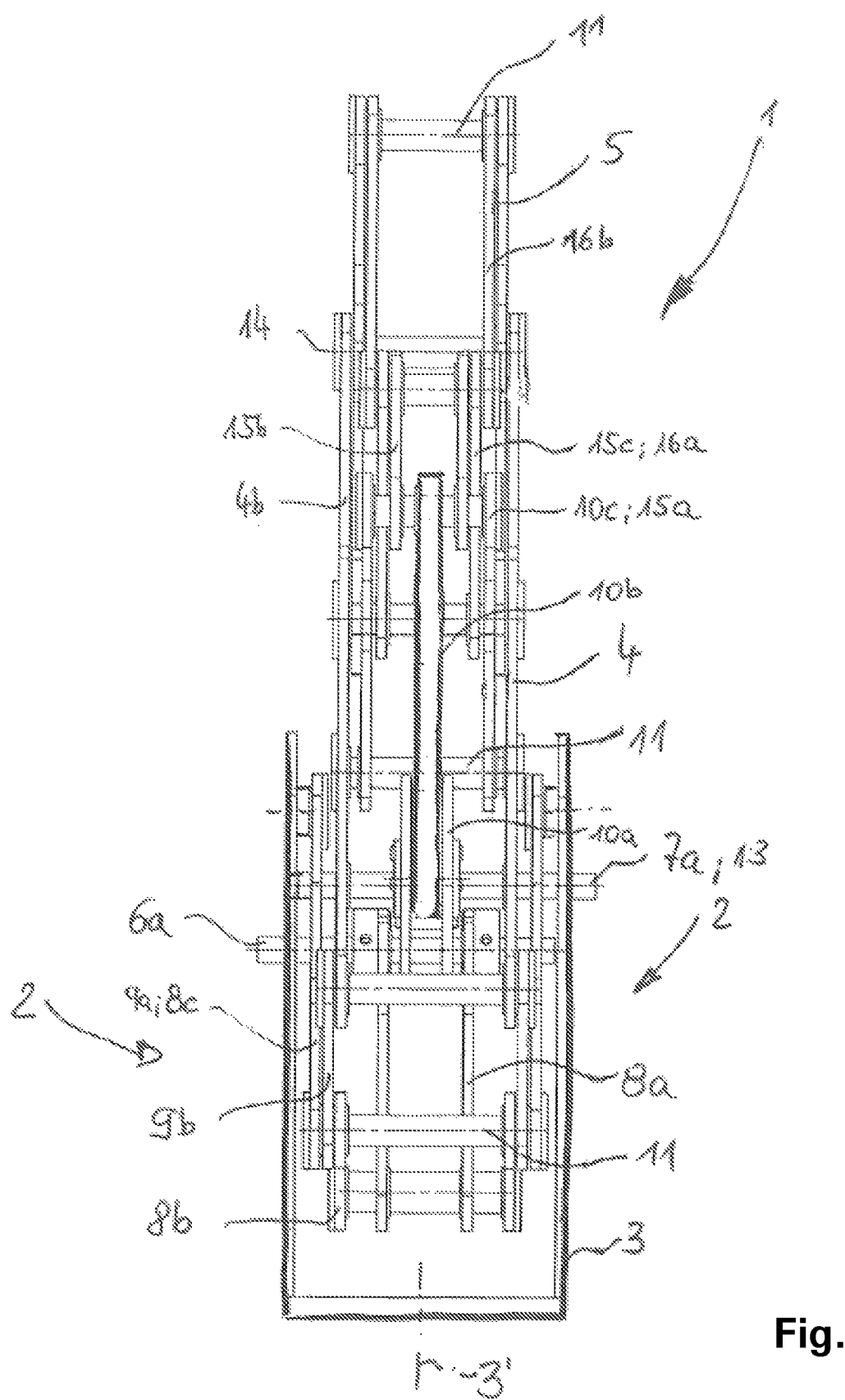
Figure 3:
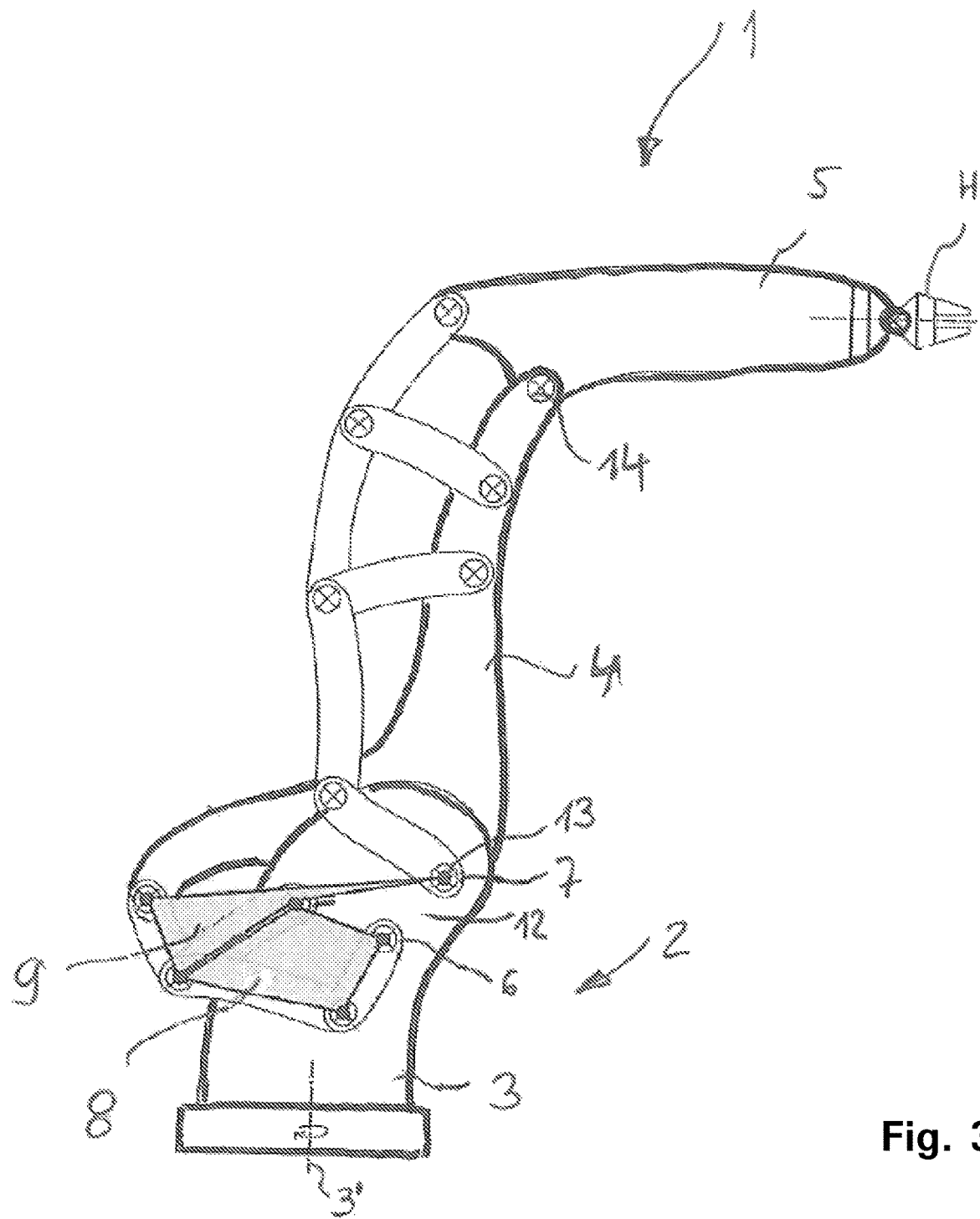
Figure 4:
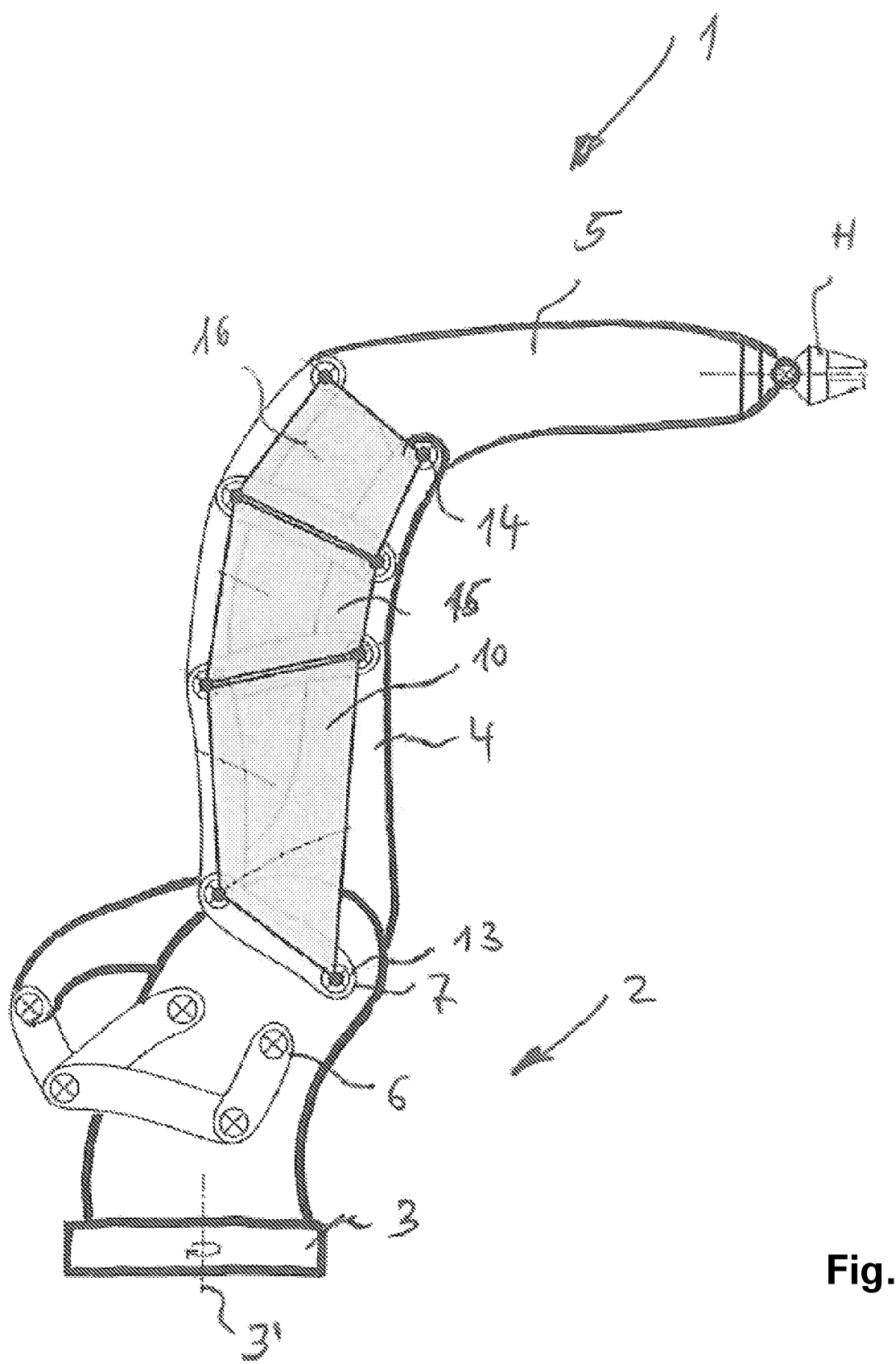

Shown are:

FIG. 1 a schematic side view of the robot;

FIG. 2 a rear view of the robot according to FIG. 1, in arrow direction II, without the representation of a drive unit;

FIG. 3 a schematic representation of the first and second multi-link chain on the robot according to FIG. 1;

FIG. 4 a schematic representation of the third multi-link chain on the robot according to FIG. 1.

DESCRIPTION OF AN EMBODIMENT

FIG. 1 shows a schematic side view of the robot 1 according to the invention. This robot 1 consists of a base unit 2, which comprises a base 3, a pivot arm 4 and a support arm 5 articulated to this pivot arm 4, a handling unit H is provided at the free end of the support arm 5, for example, a gripper arm.

The robot shown here has six degrees of freedom. A first degree of freedom is represented by the rotation of the base 3 around a first rotational axis 3'. The other degrees of freedom are achieved by pivoting the movements of the pivot arm 4 and the support arm 5, whereby the pivoting movement of the pivot arm 4 is achieved by the first drive unit 6 in conjunction with a first four-bar linkage and a second four-bar linkage 8, 9. The pivot movement of the support arm 5 is achieved by the second drive unit 7 in conjunction with the third four-bar linkage 10, the fourth four-bar linkage 15 and the fifth four-bar linkage 16. The pivot arm 4 pivots around a first pivot axis 13, and the support arm 5 around a second pivot axis 14, while the other degrees of freedom are achieved by the handling unit H.

As shown in FIG. 2, base unit 2 and thus the base 3 as well as the pivot arm 4 and the support arm 5 consist of plate-like elements. The plate-like elements are arranged at a distance from each other and connected to each other by one or more connecting elements 1. This results in a very light but very rigid construction. This symmetrical design means that there are hardly any bending and torsional loads in the support structure itself, as the structure supports each other.

The first four-bar linkage 8 starts from drive unit 6. This drive unit 6 is arranged at the base 3 and has a transmission or equivalent transmission on a drive shaft 6a mounted in the base 3. A first link 8a is provided as a crank that is torque-proof connected to this drive shaft 6a. A second link 8b is pivotally connected to this link 8a as a coupling, a third link 8c is pivotally connected with its first end at its free end as a pivot arm, whose free end in turn is fixedly yet pivotally coupled via a pivot joint 12, wherein the pivot joint 12 is arranged at the base 3. The third link can either be mounted directly at the base 3 or relatively fixed to the base 3, such that it can be rotated. This means that it is not necessary to place this link 8c directly at the base.

This link 8c also assumes the role of at least partially absorbing the forces transmitted by the pivot arm 4 via the second four-bar linkage 9, so that the first drive unit 6 is relieved.

The second four-bar linkage 9 is set in motion by the first four-bar linkage 8, and is therefore coupled to it.

The second four-bar linkage 9 consists of a further link 9a as a crank, one free end of which is connected to the base 3 (via the pivot joint 12) in a rotary manner and corresponds in itself to the rocker (marked with link 8c) of the first four-bar linkage 8. The other end is rotationally coupled to another link 9b (coupling), whereby the end opposite to the first four-bar linkage 8 is rotationally coupled to the free end 9c of the pivot arm 4. This part of the pivot arm 4 corresponds to the rocker of the second four-bar linkage 9, since the pivot arm 4 is coupled to a pivot joint axis 13 at the base 3 via a pivot joint. The pivot joint axis 13 corresponds to the axis of the drive shaft 7a of the second drive unit 7. Alternatively, the pivot joint axis 13 and the axis of the drive shaft 7a can be provided, such that they are spaced apart. The pivot arm 4 is designed as a rocker and has two sections, namely a first section at the free end of which the further link 9b of the second four-bar linkage 9 is arranged, and a second section at the free end of which the support arm 5 is hinged.

The second drive unit 7 has a drive shaft 7a, which is coupled to a first link 10a of the third four-bar linkage 10. This allows the support arm 5 in conjunction with the fourth four-bar linkage 5 and the fifth four-bar linkage 6 to be moved accordingly.

The first link (crank) is followed at the end opposite the drive shaft 7a by another link 10b as a coupling and a third link 10c as a rocker, the free end of this third link 10c of the third four-bar linkage 10 in turn being coupled to the pivot arm 4 by its one end.

This third link 10c of the third four-bar linkage 10 is the first link 15a of the fourth four-bar linkage 15, which serves as a crank. It is coupled to the end of a second link 15b of the fourth four-bar linkage 15, which in turn is coupled to a third link 15c, the free end of which in turn is pivotally connected to the pivot arm 4.

This third link 15c of the fourth four-bar linkage 15 is the first link 16a of the fifth four-bar linkage 6, which serves as a crank. It is coupled to the end of a second link 16b of the fifth four-bar linkage 16, which in turn is coupled in a rotating manner to support arm 5 and forms the third link element 6c in the form of a rocker arm. This link 16c can therefore correspond to the design of support arm 5.

This link of the second link 6b of the fifth four-bar linkage 6 is spaced from the link of the pivot arm 4 to the support arm 5.

Due to the design of the second drive unit, the design of the four-bar linkages 10, 15, 16 and the links 10c and 15c of the third and fourth four-bar linkage 10, 15, the loads arising from the load capacity are evenly distributed on the pivot arm 4, which in turn means that a lower drive power is required to pivot the pivot arm 4 and the support arm 5. The lightweight design of a pivot arm 4 and a possible support arm 5, and at least the use of a first four-bar linkage and second four-bar linkage 8, 9 for kinematic movement and the arrangement of drive units 6, 7 in the area of the base 3 have created a multi-axis robot in the form of an articulated robot that is very light, able to perform very fast movements with high rigidity, covers a large working area and can also be produced cost-effectively due to its design.

REFERENCE NUMBER LIST

Robot with multiple coupling transmission units with a lightweight design
1 Robot
2 Base unit
3 Base
3' First rotational axis
4 Pivot arm
5 Support arm
6 Drive unit
  6a Drive shaft
7 Drive unit
  7a Drive shaft
8 Four-bar linkage
  8a Link
  8b Link
  8c Link
9 Four-bar linkage
  9a Link
  9b Link
  9c Free end
10 Four-bar linkage
  10a Link
  10b Link
  10c Link
11 Connecting element
12 Pivot
13 Pivot axis
14 Pivot axis
15 Four-bar linkage
  15a Link
  15b Link
  15c Link
16 Four-bar linkage
  16a Link
  16b Link
  16c Link
H Handling unit

The invention claimed is:

1. A robot, comprising:
   a base;
   a pivot arm, which is articulated on the base and is pivotable about a rotational axis, wherein a mount for a support arm is provided at a first free end of the pivot arm;
   at least one drive unit for driving the pivot arm, and
   a plurality of link elements for transmitting the movement of the at least one drive unit to the pivot arm and the support arm;
   wherein a first drive unit is coupled to a first four-bar linkage, wherein one end of a first link element in the form of a crank is coupled in a rotationally fixed manner to a first drive shaft which is mounted in the base and connected to the first drive unit such that the first link element can rotate, in such a way that the pivot arm is pivoted about the rotational axis,
   a second end of the first link element being coupled to a first end of a second link element as a coupling and a second end of the second link element is coupled to a first end of a third link element as a swing arm, a second end of the third link element in turn being arranged in a fixed position relative to the base or on the base, the first, second, and third link elements forming the first four-bar linkage, and
   wherein a second four-bar linkage is coupled to the first four-bar linkage such that the second four-bar linkage comprises a fourth link element corresponding to the third link element of the first four-bar linkage, a first end of the fourth link element corresponding to the second end of the third link element, and a second end of the fourth link element being coupled to a first end of a fifth link element, which serves as a coupling, the fifth link element having a second end opposite the first four-bar linkage coupled to a second free end of the pivot arm;
   wherein the pivot arm constitutes a rocker in which the second free end of the pivot arm is provided at a first side of the rocker, the fifth link element of the second four-bar linkage is arranged at the second free end of the pivot arm, and the first free end of the pivot arm is arranged on a second side of the rocker at which the mount is arranged.

2. The robot according to claim 1, wherein the plurality of link elements comprise rod-shaped and/or plate-shaped elements, each of the plurality of link elements having a joint or a receptacle for a joint at their respective first and second ends.

3. The robot according to claim 1, wherein the base, the pivot arm, the support arm, and/or one or more of the plurality of link elements are of plate-shaped and/or rod-shaped construction and are connected to one another via plate-shaped and/or rod-shaped connecting elements.

4. The robot according to claim 1, further comprising:
third and fourth four-bar linkages for the kinematic movement of the support arm, seventh and tenth link elements of the third and fourth four-bar linkages being coupled to a second drive shaft of a second drive unit to form couplings of the third four-bar linkage and the fourth four-bar linkage, respectively, wherein a further pivotally connected eighth link element has its first end at a pivotally articulated connection of the seventh link element of the third four-bar linkage and the tenth link element of the fourth four-bar linkage, wherein the eighth link element is pivotally coupled at its second end to the pivot arm and forms a rocker arm of the third four-bar linkage, the eighth link element corresponds to a ninth link element forming a crank of the fourth four-bar linkage.

5. The robot according to claim 1, wherein three further four-bar linkages are provided for the kinematic movement of the support arm, wherein:
a third four-bar linkage has a sixth link element that is coupled in a rotationally fixed manner at a first end to a second drive shaft of a second drive unit, the sixth link element serving as a second crank,
a first end of a seventh link element is connected as a coupling to a second end of the sixth link element, and a first end of an eighth link element is connected to a second end of the seventh link element as a rocker arm, and a second end of the eighth link element of the third four-bar linkage in turn being pivotally coupled to the pivot arm,
the eighth link element of the third four-bar linkage corresponds to a ninth link element of a fourth four-bar linkage, the ninth link element serving as a third crank, and a second end of the ninth link element coupled to a first end of a tenth link element of a fourth four-bar linkage, and a second end of the tenth link element is in turn pivotally coupled to a first end of an eleventh link element having a second end pivotally connected to the pivot arm,
the eleventh link element of the fourth four-bar linkage corresponds to a twelfth link element of a fifth four-bar linkage, the twelfth link element serving as a fourth crank and being coupled to a first end of a thirteenth link element of the fifth four-bar linkage, and a second end of the thirteenth link element in turn is pivotally coupled to a first end of the support arm, forming a fourteenth link in the form of a rocker arm.

6. The robot according to claim 5, wherein the thirteenth link element of the fifth four-bar linkage is spaced from the linkage of the pivot arm to the support arm.

7. The robot according to claim 1, wherein the mount is a pivotally articulated mount for the support arm,
a second drive unit is provided for driving the support arm, and
a plurality of link elements are provided for transmitting movement of the second drive unit to the support arm.

8. The robot according to claim 7, wherein at least one of the support arm, the pivot arm, the base, and one of the plurality of link elements is formed of a fiber composite.

9. The robot according to claim 1, further comprising:
a third four-bar linkage provided for kinematic movement of the support arm, the third four-bar linkage having a first end of a sixth link element coupled in a rotationally fixed manner to a second drive shaft of a second drive unit, wherein a second end of the sixth link element, serving as a second crank, is connected to a first end of a seventh link element which serves as a coupling opposite to the second drive shaft, and a second end of the seventh link element is pivotally connected to the support arm which represents an eighth link element in the form of a rocker arm.

* * * * *